United States Patent
Lewis et al.

(10) Patent No.: US 9,537,812 B2
(45) Date of Patent: Jan. 3, 2017

(54) METHODS, SYSTEMS, AND MEDIA FOR MANAGING NOTIFICATIONS DIRECTED TO MULTIPLE APPLICATIONS INSTALLED ON A USER DEVICE

(71) Applicant: Google Inc., Mountain View, CA (US)

(72) Inventors: Justin Lewis, Marina del Rey, CA (US); Joseph Daverin, South Pasadena, CA (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 14/145,135

(22) Filed: Dec. 31, 2013

(65) Prior Publication Data

US 2015/0188871 A1 Jul. 2, 2015

(51) Int. Cl.
*H04L 12/58* (2006.01)
*H04L 29/08* (2006.01)
(Continued)

(52) U.S. Cl.
CPC .............. *H04L 51/24* (2013.01); *G06F 9/542* (2013.01); *H04L 51/26* (2013.01); *H04L 67/26* (2013.01); *H04W 68/00* (2013.01)

(58) Field of Classification Search
CPC ...... H04L 67/26; H04L 67/325; H04L 12/587; H04L 51/26; H04L 69/329; H04L 47/2475; H04L 47/762; H04L 47/803; H04L 65/1063; H04L 65/4084; H04L 65/60; H04L 51/24; H04L 12/1859; H04L 51/046; H04L 67/22; H04L 51/38; H04L 12/5855; H04L 12/5895; H04L 51/00; G06F 3/0481; G06F 9/542; G06F 2209/545;G06F 3/048; G06F 3/0482; G06F 11/3058; G06F 11/3409; G06F 11/3438; G06F 17/3053; G06F 1/3212; G06F 2201/86; G06F 2201/88; G06F 9/4843; H04W 4/12; H04W 4/20; H04W 4/021; H04W 8/18; H04W 4/14; H04W 52/0251; H04W 68/00; H04M 1/72552
See application file for complete search history.

(56) References Cited

U.S. PATENT DOCUMENTS

| | | | |
|---|---|---|---|
| 6,763,384 B1 * | 7/2004 | Gupta | G06Q 30/08 709/224 |
| 7,739,345 B2 * | 6/2010 | Heinzel | G06Q 10/107 709/203 |

(Continued)

*Primary Examiner* — Kevin Bates
*Assistant Examiner* — Ranjan Pant
(74) *Attorney, Agent, or Firm* — Byrne Poh LLP

(57) ABSTRACT

Methods, systems, and media for managing notifications directed to multiple applications installed on a user device are provided. In some embodiments, a method for managing notifications is provided, the method comprising: receiving, using a hardware processor, a first notification for a first application; determining a first user device associated with the first application; receiving a second notification for a second application; determining a second user device associated with the second application; determining that the first user device and the second user device are the same device; determining that the first notification and the second notification are corresponding notifications; determining that the first notification has priority over the second notification; sending the first notification to the first user device upon determining that the first notification has priority over the second notification; and inhibiting the second notification from being sent to the first user device.

24 Claims, 7 Drawing Sheets

(51) Int. Cl.
*G06F 9/54* (2006.01)
*H04W 68/00* (2009.01)

(56) References Cited

U.S. PATENT DOCUMENTS

| | | | | |
|---|---|---|---|---|
| 8,024,415 | B2* | 9/2011 | Horvitz | G05B 19/404 |
| | | | | 709/206 |
| 8,560,632 | B2* | 10/2013 | Kamga | H04L 67/2823 |
| | | | | 709/206 |
| 8,599,014 | B2* | 12/2013 | Prykari | H04L 67/26 |
| | | | | 340/540 |
| 9,179,256 | B1* | 11/2015 | Pietraniec | H04W 4/021 |
| 2004/0139447 | A1* | 7/2004 | Hope | G06F 9/542 |
| | | | | 719/318 |
| 2010/0003914 | A1* | 1/2010 | Lee | H04H 60/25 |
| | | | | 455/3.01 |
| 2013/0219332 | A1* | 8/2013 | Woley | G06F 1/3209 |
| | | | | 715/808 |
| 2013/0226988 | A1* | 8/2013 | Chen | H04L 12/1895 |
| | | | | 709/202 |
| 2014/0075383 | A1* | 3/2014 | Zheng | G06F 9/4443 |
| | | | | 715/810 |
| 2014/0095692 | A1* | 4/2014 | Anderson | H04L 67/22 |
| | | | | 709/224 |
| 2014/0108558 | A1* | 4/2014 | Borzycki | G06F 21/6218 |
| | | | | 709/205 |
| 2014/0195620 | A1* | 7/2014 | Srinivasan | H04L 51/14 |
| | | | | 709/206 |

* cited by examiner

METHODS, SYSTEMS, AND MEDIA FOR MANAGING NOTIFICATIONS DIRECTED TO MULTIPLE APPLICATIONS INSTALLED ON A USER DEVICE

TECHNICAL FIELD

The disclosed subject matter relates to methods, systems, and media for managing notifications directed to multiple applications installed on a user device.

BACKGROUND

Push notification services are generally used to send messages to various computing devices, such as mobile devices. More particularly, push notifications are often used by application publishers and/or developers to send information to users of the applications or to encourage continued use of the applications. For example, a publisher or developer of an application for accessing media content, such as videos, can send a push notification when a new video that might be of interest to a user becomes available. As another example, a publisher or developer of an application for accessing a social networking service can send a push notification when a social connection associated with a user posts or shares something which might interest the user. As the number of applications that send push notifications continues to rapidly increase, notifications for multiple different applications may be sent that contain the same or similar information. This may becoming irritating to a user that receives the same information multiple times from different applications.

Accordingly, it is desirable to provide methods, systems, and media for managing notifications directed to multiple applications installed on a user device.

SUMMARY

In accordance with various embodiments of the disclosed subject matter, methods, systems, and media for managing notifications directed to multiple applications installed on a user device are provided.

In accordance with some embodiments of the disclosed subject matter, a method for managing notifications is provided, the method comprising: receiving, using a hardware processor, a first notification for a first application; determining a first user device associated with the first application; receiving a second notification for a second application; determining a second user device associated with the second application; determining that the first user device and the second user device are the same device; determining that the first notification and the second notification are corresponding notifications; determining that the first notification has priority over the second notification; sending the first notification to the first user device upon determining that the first notification has priority over the second notification; and inhibiting the second notification from being sent to the first user device.

In accordance with some embodiments of the disclosed subject matter, a system for managing notifications is provided, the system comprising: a hardware processor that is configured to: receive a first notification for a first application; determine a first user device associated with the first application; receive a second notification for a second application; determine a second user device associated with the second application; determine that the first user device and the second user device are the same device; determine that the first notification and the second notification are corresponding notifications; determine that the first notification has priority over the second notification; send the first notification to the first user device upon determining that the first notification has priority over the second notification; and inhibit the second notification from being sent to the first user device.

In accordance with some embodiments of the disclosed subject matter, a non-transitory computer-readable medium containing computer executable instructions that, when executed by a processor, cause the processor to perform a method for managing notifications is provided, the method comprising: receiving a first notification for a first application; determining a first user device associated with the first application; receiving a second notification for a second application; determining a second user device associated with the second application; determining that the first user device and the second user device are the same device; determining that the first notification and the second notification are corresponding notifications; determining that the first notification has priority over the second notification; sending the first notification to the first user device upon determining that the first notification has priority over the second notification; and inhibiting the second notification from being sent to the first user device.

In accordance with some embodiments of the disclosed subject matter, a system for managing notifications is provided, the system comprising: means for receiving a first notification for a first application; means for determining a first user device associated with the first application; means for receiving a second notification for a second application; means for determining a second user device associated with the second application; means for determining that the first user device and the second user device are the same device; means for determining that the first notification and the second notification are corresponding notifications; means for determining that the first notification has priority over the second notification; means for sending the first notification to the first user device upon determining that the first notification has priority over the second notification; and means for inhibiting the second notification from being sent to the first user device.

In some embodiments, the system further comprises: means for receiving an application identifier that uniquely identifies the first application installed on the first user device; and means for determining a device identifier of the first user device based on a device associated with the application identifier.

In some embodiments, means for determining that the first user device and the second user device are the same device further comprises means for determining that the device identifier of the first device is the same as a second device identifier of the second device.

In some embodiments, means for determining that the first notification and the second notification are corresponding notifications comprises: means for determining a distance between content of the first notification and content of the second notification; and means for determining that the content is the same based on the determined distance being below a threshold.

In some embodiments, means for determining that the first notification and the second notification are corresponding notifications comprises: means for determining a first notification identifier associated with the first notification; means for determining a second notification identifier associated with the second notification; and means for determining that the first notification and the second notification are corresponding notifications based on correspondence between the first notification identifier and the second notification identifier.

In some embodiments, means determining that the first notification has priority over the second notification comprises means for determining that the first notification and the second notification are directed at content that is available by using the first application but not by using the second application.

In some embodiments, means determining that the first notification has priority over the second notification comprises means for determining that the first application is designated by the first notification and the second notification as having priority over the second application.

In some embodiments, means for determining that the first notification has priority over the second notification comprises determining that the first application is a subordinate application of the second application.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
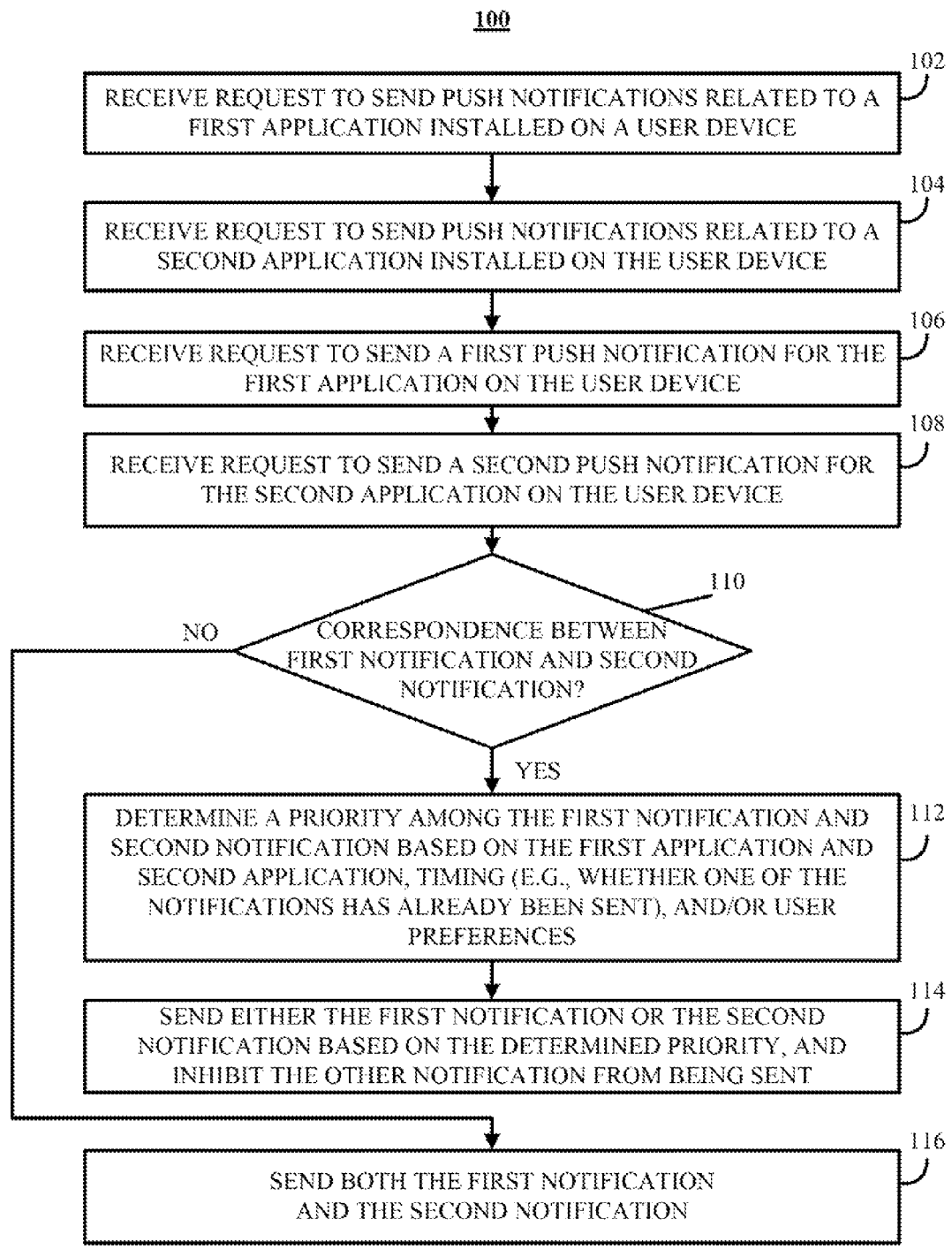
FIG. 1 shows an example of a process for managing notifications directed to multiple applications installed on a user device in accordance with some embodiments of the disclosed subject matter.

In accordance with various embodiments, mechanisms (which can include methods, systems, and/or media) for managing notifications directed to multiple applications installed on a user device are provided.

In some embodiments, the mechanisms described herein can determine which notifications and, more particularly, which push notifications from multiple corresponding push notifications to present to a user. For example, if a user device has two or more related applications installed that are set to receive push notifications, the publisher or developer of those related application may send the same or similar push notifications for at least two of the related applications. In a more particular example, the user device can have installed on it an application for accessing media content from a media content delivery platform (e.g., a video sharing and/or aggregation service) and an application for accessing a social networking service that is related to the media content delivery platform (e.g., the social networking service may be owned by the same entity). In another more particular example, the user device can have installed on it an application for receiving email which can be configured to access email from various domains (e.g., a general email client that can be configured to retrieve email from a variety of email services) and an application for receiving email sent to a particular domain and/or email service (e.g., a specialized email client for receiving email from a particular email service). Although push notifications can be used to increase use of a particular application by the user, overwhelming the user with too many push notifications may cause the user to choose to stop receiving push notifications altogether, which may be counterproductive.

In some embodiments, when two push notifications are received for two different applications, the mechanisms described herein can determine whether the two push notifications are corresponding push notifications. Two or more push notifications for different application can be corresponding notifications for any suitable reason, such as that the two or more notifications include similar content, reference similar media content or the like, or for any other suitable reason. For example, a first push notification can be received for a media content delivery platform application informing the user that a new video is available from a channel that the user has subscribed to, and a second push notification can be received for a social networking service application informing the user that the same new video is available from the media delivery platform because the user follows the artist that published the video on the social networking service.

In some embodiments, when two or more push notifications for different applications are determined to be corresponding notifications, the mechanisms described herein can cause one of the corresponding notifications to be presented to the user, and cause the other corresponding notification (or notifications) to be inhibited from being presented to the user. Additionally, a priority can be determined among the corresponding notifications to determine which among the corresponding notifications to present to the user. As described below in connection with, for example 112 of FIG. 1, the priority can be determined based on any suitable criterion or criteria. For example, a notification for a media content delivery platform application about a new video can be given priority over a similar notification for a social networking service application because the video is accessible on the media content delivery platform.

Turning to FIG. 1, an example of a process 100 for managing notifications directed to multiple applications installed on a user device is shown in accordance with some embodiments of the disclosed subject matter. In some embodiments, process 100 can be executed by an intermediary device between a device or devices providing push notifications and devices targeted by such notifications. For example, process 100 can be executed by a push notification server that sends a push notification to a particular user device in response to receiving a request to send such a push notification to a particular instance of an application installed on the user device. At 102, process 100 can receive a request to send push notifications related to a first application installed on a user device. For example, process 100 can receive a request to send push notifications related to an application for accessing media content associated with a media content platform. Such push notifications can include information related to media content items that the user may be interested in, related to sources of media content (e.g., authors, artists, channels, etc.) that the user may be interested in, etc.

In some embodiments, the user device can be a mobile device, such as a smartphone or other cellular telephone, a tablet computer, a wearable computer, a personal digital assistant, a portable music player, a portable video player, a handheld game console, or any other suitable mobile device. Additionally or alternatively, the user device can be any suitable computing device, such as a laptop computer, a desktop computer, a set-top box, a game console, a digital media receiver, or any other suitable computing device.

In some embodiments, a request at 102 to send push notifications related to the first application can be sent in response to any suitable action. For example, an operating system or other software platform installed on the user device can be programmed such that applications installed on the user device can request to receive push notifications related to the application. Whether or not a particular application requests, push notifications can be based on any suitable circumstances or combination of circumstances. For example, whether a particular application requests push notifications can be based on programming of the application by the publisher and/or developer of the application (e.g., whether the publisher and/or developer of the application includes this feature as part of the application). As another example, whether a particular application requests push notifications can be based on settings managed by a user (e.g., the user can change the settings to allow or inhibit push notifications from being sent for particular applications or for all applications). As yet another example, a determination of whether or not to send notifications can be based on a status of the device (e.g., based on whether the device is powered on, whether the device's transmitter and/or receiver is active, whether the device is in a "do not disturb" mode, etc.).

In some embodiments, a request to send push notifications related to the first application can be sent by a user device at any appropriate time. For example, the request to send push notifications can be sent when the user device is powered on, when a transmitter and/or receiver of the user device is activated, periodically (e.g., every thirty seconds, every minute, every thirty minutes, etc.), when a network address of the user device changes, or at any other suitable time. Additionally, a request to send push notifications related to the first application can be sent by the user device using any suitable technique or techniques. For example, the request to send push notifications can be sent to a push notification server using a network to which the user device is connected. As another example, the request can be sent to a particular network address (e.g., an Internet Protocol (IP) address, a media access control (MAC) address, or any other suitable network address) associated with the push notification server, a particular port of a push notification server, or using any other technique or techniques.

In some embodiments, the request to send push notifications related to the first application can include any suitable information. For example, the request can include an application identifier for the first application, which can identify a particular instance of the first application. In a more particular example, each instance of an application can be assigned an identifier when the application is installed on a device. This identifier can be used to address information (such as push notifications) to a particular application and can be independent of a current network address of a user device on which the application is installed. As another example, the request can include a network address of the user device on which the particular instance of the first application is installed. As yet another example, the request can include a device identifier that is assigned by the manufacturer of the user device or by the operating system of the device which can be used to uniquely identify a particular device regardless of a current network address. Additionally, any other suitable information can be included in the request to send push notifications related to the first application.

Additionally or alternatively, certain information such as a device identifier, a security token, or any other suitable information can be generated as part of a process that is initiated by the request to send push notifications related to the first application. For example, the first application can cause the user device to request that push notifications be sent related to the first application. This can cause the push notification server to generate a security token that can be used to verify push notifications sent for the particular instance of the first application. This security token can be used by the push notification server to identify the user device and/or the particular instance of the first application installed on the user device when it accompanies a request to send a push notification to a particular instance or particular instances of an application installed on a user device or user devices.

In some embodiments, the first application can cause the security token and/or any other suitable information to be sent to an application publisher. For example, the security token can be sent with the application identifier which can be used by the application publisher to identify the particular instance of the application. Identifying a particular instance can be used in some cases for targeting push notifications to certain users. As another example, a username that was used to sign in to a service associated with the first application or information derived from the username (e.g., a hash derived from the username) can be sent to the application publisher. This username information can, for example, be used by an application publisher to identify an account, characteristics, settings and any other information associated with a particular username that is signed in to the first application. In some embodiments, the second application can be any suitable application installed on the user device.

It should be noted that, in situations in which the mechanisms described herein collect personal information about users, or can make use of personal information, the users can be provided with an opportunity to control whether programs or features collect user information (e.g., information about user actions stored on a user device, information about user actions or preferences stored on a remote device such as server, etc.), or to control whether and/or how push notifications are sent. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

At 104, process 100 can receive a request to send push notifications related to a second application installed on the user device. The second request can include similar information to the first request (e.g., an application identifier, a user device identifier, etc.), as described above in connection with 102.

In some embodiments, the second application can be related to the first application in some way. For example, the first application and the second application can both be used to access at least a portion of the same content. In this example, the first application and the second application can provide different points of entry to at least a portion of the same content. In a more particular example, if the first application is an application for accessing media content from a media content platform (e.g., a video sharing platform), the second application can be an application for accessing media content from a particular user of the media content platform (e.g., content uploaded to a video sharing platform by a particular publisher or artist). As a more particular example, the first application can be an application for accessing substantially all videos made available by a video sharing service, and the second application can be an application for accessing videos available through a particular channel that are made available by the same video sharing service. In this more particular example, the second application can also provide access to other videos other than the videos from the particular channel, but can provide access to the videos from the channel preferentially. Additionally, a user interface of the second application can be customized based on, for example, a user that the channel is associated with (e.g., a band, a comedian, a university, etc.). As another example, the first application can be an application for accessing media content from a media content platform and the second application can be an application for accessing a social networking service related to the media content platform (e.g., the social networking service is provided by the same entity as the media content platform). As yet another example, the first application and the second application can be related based on the fact that the applications were produced by the same entity (e.g., the first application and the second application have a common developer). As still another example, the first application and the second application can be related in any suitable manner, such as by a cross-promotional agreement between a publisher of the first application and a publisher of the second application.

At 106, process 100 can receive a request to send a first push notification for the first application on the user device. In some embodiments, such a request can be received from an application publisher server that sends the request to send a push notification or push notifications to a particular instance or particular instances of the first application. For example, a publisher or developer of the application can use a server or other suitable computing device to send a request to a push notification server (e.g., a server or other suitable computing device that is executing process 100) to send the first push notification to a particular instance or particular instances of the first application.

Additionally, in some embodiments, such a request can include or be associated with any suitable information needed to send a push notification to a particular device or particular devices associated with a particular instance of the first application. For example, the request can include or be associated with identifying information about a particular instance or particular instances of the first application. As discussed above, such identifying information can include an application identifier, a device identifier, a security token associated with a particular instance of the first application etc. As another example, the request can include or be associated with content to be presented with the push notification. In a more particular example, the content can include text, images, video, instructions to be executed by the first application, any other suitable content and/or any suitable combination of such content. As yet another example, the request can include or be associated with information indicating the identity of applications that may be sent corresponding push notifications and/or a priority for each of these applications with regard to the current push notification. In a more particular example, the request can include the identity of another application (e.g., the second application) which may receive a corresponding notification and an indication of whether the first application has priority over the second application. As still another example, the request can include or be associated with information indicating how the push notification should be presented, which user interface elements if any should be presented with the push notification, etc.

In some embodiments, the request can include or be associated with identifying information of the push notification. For example, each push notification can have associated identifying information. This identifying information can include various information about the push notification, such as a time when the push notification was sent by the application publisher server, a code that identifies the content or a category of the push notification, and/or any other suitable identifying information.

In some embodiments, process 100 can determine for incoming push notifications an identity and/or network address of a user device to which the push notification is directed as part of, or in response to, receiving the request to send the first push notification. Any suitable technique or techniques can be used to determine an identity and/or network address to which the push notification is directed. For example, a device executing process 100, such as a push notification server, can maintain a database of application identifiers, device identifiers, network addresses, etc., associated with particular instances of applications and/or particular devices. As another example, a device executing process 100 can determine device identifier and/or network address based on a security token or other security information included in or associated with the request to send the first push notification. Any other suitable technique or techniques or any suitable combination of these and other techniques can be used to determine an identity and/or a network address of a user device.

At 108, process 100 can receive a request to send a second push notification for the second application on the user device. The request received at 108 can be similar to the request received as described above in connection with 106, except directed to a different, second application.

At 110, process 100 can determine whether the first push notification and the second push notification are corresponding notifications. Any suitable technique or techniques can be used to determine whether the first push notification and the second push notification are corresponding notifications. For example, process 100 can determine whether content of the first push notification is the same as content of the second push notification. As another example, process 100 can compare content of the first push notification to content of the second push notification and determine a similarity (or difference) score between the two notifications. If the similarity score is over a threshold (or if the difference score is below a threshold), the two notifications can be determined to be corresponding notifications. As yet another example, process 100 can determine whether the first application and the second application are related applications, which can be determined based on any suitable information available to process 100 such as information in a database of related applications, information included with the first push notification and/or second push notification, or any other suitable information. As still another example, process 100 can determine whether at least a portion of identifying information of the first push notification and the second push notification is sufficiently similar or identical. If at least a portion of the identifying information is sufficiently similar or identical, process 100 can determine that the notifications are corresponding notifications.

As a further example, process 100 can determine whether the first push notification and the second push notification were sent at the same time or sent close to the same time (e.g., within one second, two seconds, etc.) which can indicate that the notifications are likely to be corresponding notifications. As another further example, process 100 can determine whether the first push notification and the second push notification were sent from the same source, such as from the same entity (e.g., a publisher and/or developer of the first and second application). Any suitable technique or techniques can be used to determine whether the notifications came from the same source, such as by determining that at least a portion of identifying information of the entity that sent the notifications is the same or sufficiently similar, determining that security information included with the first and second push notifications is sufficiently similar or identical, determining that a network address or portion of the network address from which the notifications were sent is the same or sufficiently similar, and/or any other suitable technique. In some embodiments, any other suitable techniques and/or a combination of the previously described techniques can be used to determine whether the first push notification and the second push notification are corresponding notifications.

If process 100 determines that the first push notification and the second push notification are corresponding notifications ("YES" at 110), process 100 can proceed to 112.

At 112, process 100 can determine a priority between the first push notification and the push second notification based on an identity of the first application and an identity of the second application. More particularly, process 100 can determine whether to send the first push notification to the user device or to send the second push notification to the user device. Any suitable technique or techniques can be used to determine a priority between the first push notification and the second push notification. For example, the request to send the first push notification and/or the request to send the second push notification can include information on a priority of the notification with respect to corresponding notifications for other related applications. As another example, process 100 can determine the priority based on previous behavior of the user (e.g., whether the user is more likely to use the first application or the second application). As yet another example, the request to send the first push notification or the request to send the second push notification can include or be associated with information designating that push notification as having priority over other corresponding push notifications. As still another example, if either the first push notification or the second push notification has already been sent to the user device, that notification can be given priority regardless of which notification would otherwise be given priority. In some cases, even if the first push notification and the second push notification are sent by the application publisher server or application publisher servers at substantially the same time (e.g., within one second, two seconds, etc.), one of the notifications may be delayed in arriving. In this case, the first notification to arrive can be sent to the user device without determining that there is a corresponding notification. If process 100 then identifies the second notification to arrive as being a corresponding notification, process 100 can inhibit the second arriving notification from being sent to the user device regardless of a priority that would be determined between the first to arrive notification and second to arrive notification if neither notification had yet been sent.

At 114, process 100 can cause either the first notification or the second notification to be sent to the user device based on the priority determined at 112. Any suitable technique or techniques can be used to send the push notification. For example, the push notification server can attempt to send the push notification selected based on the priority to a particular network address associated with the user device. As another example, the user device can be setup to listen for notifications that are sent from or to a particular network address and/or a particular port. As yet another example, a push notification for a particular user device can be stored in a particular location that the user device can periodically check for content. As still another example, the user device can be setup to periodically retrieve various data from a central server, which can include weather, user account changes, notifications, and/or any other suitable data. The operating system of such a user device can send a general request for updated data to the central server and the central server can respond with any suitable updated data. In some embodiments, process 100 can inhibit a notification that is not sent at 114 from being sent. For example, the non-sent notification can be deleted, cancelled, allowed to expire, etc.

In some embodiments, process 100 may not have enough information to determine a priority among the first notification and the second notification. For example, if a particular user's preferences with regard to the first application and the second application are not clear, process 100 may not be able to determine a priority, in some embodiments.

In some embodiments, process 100 can send both the first notification and the second notification, and determine which of the notifications the user selects to perform an action associated with the corresponding first notification and second notification. For example, both notifications can be sent and a user device that receives the notifications can report back on which of the notifications the user selected. This can be done any suitable number of times and, if the user expresses a preference for first application or second application (e.g., by consistently selecting the notification corresponding to that application), process 100 can use that information in determining a priority, for example, at 112. In another example, the first notification, the second notification or both notifications can be sent and a user device that receives the notification or notifications can be instructed to present options to the user upon selection of the first notification or the second notification. These options can be presented to the user to query the user and determine whether to perform an action (e.g., an action that can be performed using either the first application or the second application, such as presenting a video, presenting an email, etc.) using the first application or the second application. In some embodiments, upon selecting to perform the action using either the first application or the second application, the user device can further query the user as to whether to use the selected application to always perform the selected action for similar notifications. Upon the user selecting to always perform that action using the selected application, the user device can report back an identity of the selected application as being a preferred application. Process 100 can then use this information in determining a priority, for example, at 112.

Returning to 110, if the notifications are not corresponding notifications ("NO" at 110), process 100 can proceed to 116. At 116, process 100 can cause both the first push notification and the second push notification to be sent to the user device. As described above, the first push notification and the second push notification can be sent using any suitable technique or combination of techniques.

Figure 2:
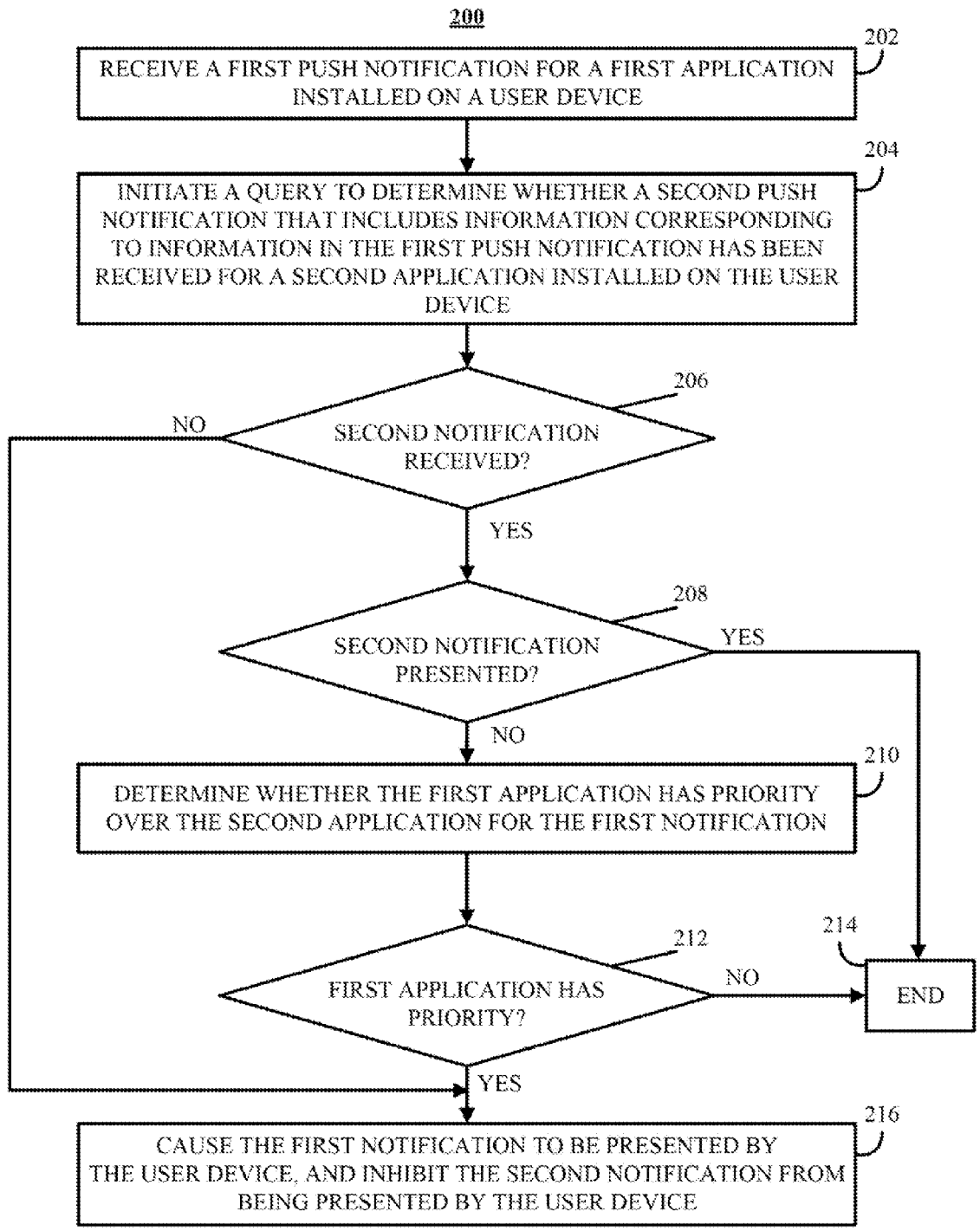
FIG. 2 shows an example of a process for managing notifications received for multiple applications installed on a user device in accordance with some embodiments of the disclosed subject matter.

Turning to FIG. 2, an example of a process 200 for managing notifications received for multiple applications installed on a user device is shown in accordance with some embodiments of the disclosed subject matter. In some embodiments, process 200 can be executed by a user device that receives push notifications. For example, process 200 can be executed by a user device that receives multiple push notifications from a push notification server that sends push notifications to the user device in response to receiving a request to send a push notification to an application installed on the user device from the application publisher server.

At 202, process 200 can receive a first push notification for a first application installed on a user device running process 200. The push notification can be received using any suitable technique or combination of techniques. For example, as described above in connection with 114 of FIG. 1, the user device can listen for notifications on a particular port and/or from a particular network address. As another example, the user device can periodically check a particular network address for the presence of push notifications. In some embodiments, a push notification can identify a particular username to which the push notification is directed. For example, some applications can allow a user to sign in to the application using multiple usernames. When a push notification is received that identifies a particular username, process 200 can determine whether the identified username is still signed in to the application, and if not can inhibit presentation of the received push notification (e.g., process 200 can end).

At 204, process 200 can initiate a query to determine whether a corresponding second push notification was received for a second application installed on the user device. Any suitable technique or techniques can be used to initiate the query, the query can take any suitable form, and the query can be processed using any suitable techniques. For example, the query can include checking an area of memory that is allocated as memory shared by the first application and the second application. In a more particular example, each application can be allocated a particular portion of memory of the user device, and certain applications can be assigned shared memory. Applications can be assigned shared memory if the applications are programmed as related applications that request memory shared between other related applications. Applications can be related, for example, if they are available from the source (e.g., same publisher, developer, etc.). When a push notification is received for an application that has shared memory with another application, the notification can be at least temporarily stored in the shared memory prior to presenting the push notification to the user. When the first push notification is received at 202, process 200 can check shared memory for the first application to determine whether information from a second push notification is stored in shared memory, at 204. In some embodiments, the first application and the second application can be allocated shared memory on the push notification server. In such embodiments, when the push notification server receives a push notification for the first application, a process executing on the push notification server can check the shared memory to determine whether information from a second push notification is stored in shared memory, for example.

As another example, the query can include querying an operating system running on the user device to determine whether a corresponding notification was received for the second application or another related application. In this example, the operating system of the user device can maintain a record of push notifications that are received and information associated with such push notifications. When the first notification is received, the query can be initiated to determine whether a second push notification is received shortly thereafter (e.g., within one second, two seconds, ten seconds, one minute, etc.) or was received prior to receiving the first notification. In such an example, the operating system can wait a short time after receiving a push notification for other push notifications to be received that may be corresponding notifications to the received push notification. This can allow for a push notification for a first application having higher priority to be presented to the user even if it is received shortly after a corresponding push notification for a second application having a lower priority.

As yet another example, the query can include querying the second application directly to determine whether a notification was received for the second application. Any suitable technique or techniques can be used to query the second application. As still another example, the query can include checking information included with or associated with the first push notification to determine whether the first push notification is related to a second application, and querying the operating system to determine whether the second application is installed on the user device. If the first push notification is related to the second application, and the second application is installed on the device, process 200 can determine whether a notification was received for the second application.

In some embodiments, any suitable technique or techniques can be used to determine whether the first push notification and the second push notification are corresponding notifications. For example, a technique or combination of techniques described above in connection with 110 of FIG. 1 can be used to determine whether the first push notification and the second push notification are corresponding notifications.

If a corresponding notification was not received for the second application ("NO" at 206), process 200 can proceed to 216 where the first push notification can be presented by the user device. Otherwise, if a corresponding notification was received for the second application ("YES" at 206), process 200 can proceed to 208.

At 208, process 200 can determine whether the second, corresponding push notification has been presented to the user. Any suitable technique or techniques can be used to determine whether the second, corresponding push notification has been presented. For example, a history of notifications that have been presented can be maintained and that history can be queried to determine whether the second push notification has been presented. As another example, the second application can keep a record of presented notifications that can be queried to determine whether the second notification has been presented. As yet another example, if the second notification has been presented to the user, but the second notification has not been acknowledged by the user (e.g., the second notification has not been selected or cleared), the second notification can be considered to have not been presented to the user. As still another example, a record of presented notifications can be maintained by a server (e.g., the push notification server and/or any other suitable server), which can maintain the records of which notifications have been presented across multiple user devices (e.g., a user's smartphone and tablet) and/or multiple services (e.g., if the information in the push notification is also sent to an email address associated with the user), as well as across multiple applications installed on the same device. In such an example, process 200 can query the server prior to presenting the first push notification to determine if a second push notification was presented to the user by an application installed on another device, by another service, and/or by another application installed on the device executing process 200. If the second, corresponding push notification has been presented ("YES" at 208), process 200 can proceed to 214, where process 200 can end. Otherwise, if the second, corresponding push notification has not been presented ("NO" at 208), process 200 can proceed to 210.

At 210, process 200 can determine whether the first application has priority over the second application. Any suitable technique or combination of techniques can be used to determine whether the first application has priority over the second application. For example, techniques described above in connection with 112 of FIG. 1 can be used to determine whether the first application has priority over the second application. As another example, one of the first application and the second application can be set as a master application and the other can be set as a slave application. When corresponding push notifications are received for the master application and the slave application, priority can be decided by the master application. As still another example, priority can be determined based on whether the first application is a more limited application (e.g., allows the user to access a narrower subset of the content than the content that the second application allows the user to access). In this example, the more limited application can be given priority in some embodiments.

If the first application does not have priority over the second application ("NO" at 212), process 200 can proceed to 214, where process 200 can end. Otherwise, if the first application does have priority over the second application ("YES" at 212), process 200 can proceed to 216.

At 216, process 200 can cause the first notification to be presented by the user device, and can inhibit the second notification from being presented to the user. In some embodiments, if the second notification has been presented bur not yet acknowledged by the user, the second notification can be deleted or otherwise no longer made available to the user and the first notification can be presented instead. Any suitable technique(s) can be used to present the notification. For example, a notification in any suitable format can be presented to the user on a display of the user device. As another example, a particular sound can be played that indicates to the user that a notification has been received. In some embodiments, different sounds can be used for notifications to different applications. As yet another example, an indicator can be presented to the user that indicates that a notification has been received. This indicator can indicate that a notification has been received for a particular application, and/or generally indicate that a notification has been received for an application installed on the user device. In some embodiments, the indicator can be a light that flashes when a notification has been received and/or when a notification is pending and has not yet been viewed by a user. Additionally, in some embodiments, a technique or techniques used for presenting a push notification can be based on settings of the user device that receives the push notification. For example, the way that the notification is presented to the user can be based on settings that are adjustable by the user.

Although the examples described herein are generally described with reference to two notifications, the mechanisms described herein can be extended to apply to any suitable number of corresponding notifications.

Figure 3:
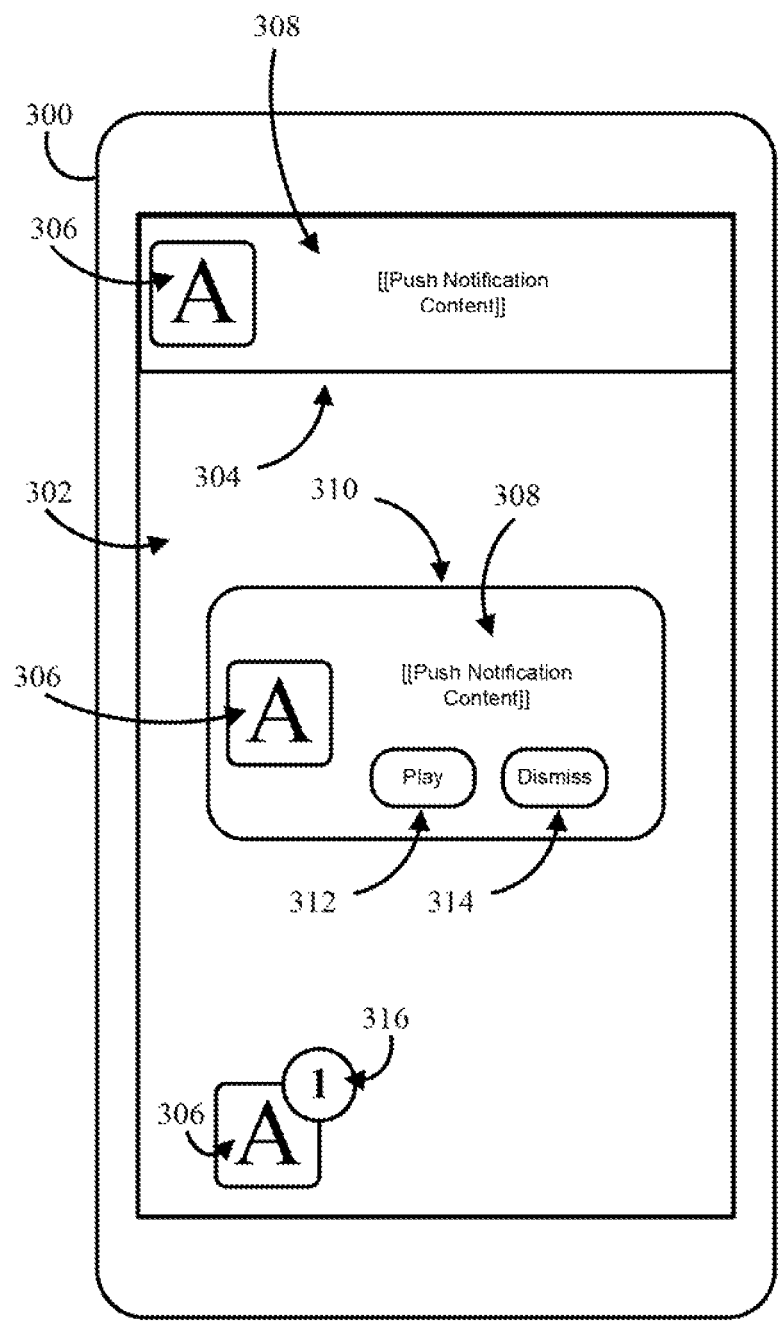
FIG. 3 shows examples of various techniques for presenting a push notification received by a mobile device in accordance with some embodiments of the disclosed subject matter.

FIG. 3 shows various examples of notifications that can presented by a mobile device 300 in response to receiving a push notification. As shown in FIG. 3, mobile device 300 can present a notification or notifications using a display 302. In some embodiments, display 302 can be a touchscreen display that can be used to receive input from a user as well as to present information to the user as a display. Notifications and/or an indication that a notification has been received can be presented in various ways. For example, in some embodiments, a notification can be presented as a banner 304 across a top of display 302. Note that in this example the banner is presented across the top of display 302, but the banner 304 can be presented along any suitable edge of the display. Additionally, the edge of the display in which banner 304 is presented can be based on an orientation of mobile device 300. In some embodiments, banner 304 can be presented along a portion of an edge of display 302 rather than along an entire edge of display 302.

In some embodiments, banner 304 can include an icon 306 that can be an icon of an application associated with the push notification. For example, if the push notification that caused banner 304 to be displayed was sent for application A, icon 306 can be an icon associated with application A. In some embodiments, banner 304 can also include push notification content 308. Push notification content 308 can include any suitable content that was sent with the push notification. For example, push notification content can include text, images, video, hyperlinks, and/or any other suitable content.

In some embodiments, a notification can be presented as a pop-up message 310 in a central portion of display 302. Pop-up message 310 can include icon 306 and content 308. In some embodiments, pop-up message 310 can also include user interface elements 312 and 314 for causing the application that corresponds to the message to open and perform a particular action. For example, if the notification that causes pop-up message 310 to be presented is about a video available through application A, selecting user interface element 312 can cause application A to be opened and can cause the video to be played, while selecting user interface element 314 can dismiss pop-up message 310.

In some embodiments, the fact that a notification was received for a particular application can be indicated by the presence of a badge 316 presented in association with an icon 306 of the application. Badge 316 can indicate that a notification has been received and, in some embodiments, can also indicate how many notifications have been received but not acted upon by the user (e.g., by selecting the received notifications or clearing them).

Although several examples are shown in FIG. 3, these examples are merely illustrative and notifications may be presented using many other techniques. It is noted that a particular user device can present only a single notification in response to receiving a push notification and that different styles of notification presentation may not be presented simultaneously. In some embodiments, any other suitable techniques can be used in presenting notifications. For example, a notification center that presents at least a portion of recently received notifications can be presented by the user device in response to a user action. As another example, notifications that have been presented to the user can be automatically deleted and/or cleared if the user acknowledges the same notification on a different user device that is associated with the same user.

As described above in connection with 216 of FIG. 2, in some embodiments, settings of mobile device 300 can control how push notifications are presented. For example, the settings can be used in determining whether a notification will be presented as banner 304, pop-up message 310 or badge 316. Additionally, in some embodiments, settings can be different for different applications, such that for a first application banner 304 is presented, but for a second application, only badge 316 is presented. In some embodiments, such settings of mobile device 300 can be used in determining a priority at, for example, 210 of FIG. 2.

Figure 4:
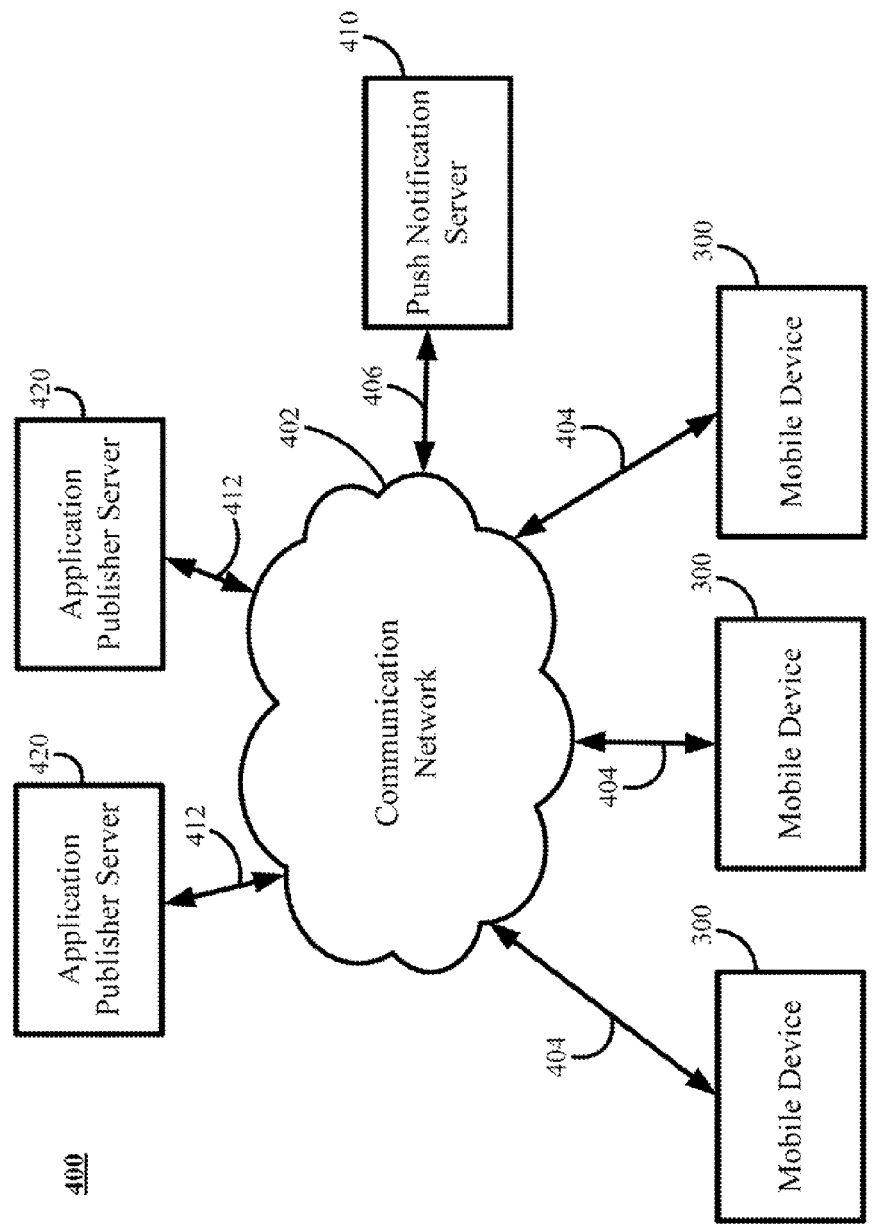
FIG. 4 shows a schematic diagram of an illustrative system suitable for implementation of mechanisms described herein for managing notifications directed to multiple applications installed on a user device in accordance with some embodiments of the disclosed subject matter.

FIG. 4 shows an example 400 of a generalized schematic diagram of a system on which the mechanisms for notifications directed to multiple applications installed on a user device as described herein can be implemented in accordance with some embodiments. As illustrated, system 400 can include one or more mobile devices 300. Mobile devices 300 can be local to each other or remote from each other. Mobile device 300 can be connected by one or more communications links 404 to a communications network 402 that can be linked via a communications link 406 to one or more push notification servers 410, and mobile device 300 and/or push notification server 410 can be linked via a communication link 412 to one or more application publisher servers 420.

In some embodiments, each of mobile devices 300, push notification servers 410, and application publisher servers 420 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, mobile device 300 can be implemented as a smartphone or other cellular telephone, a tablet computer, a wearable computer, a personal digital assistant, a portable music player, a portable video player, a handheld game console, or any other suitable mobile device. Additionally, although mobile device 300 is described as being a mobile computing device, the mechanisms described herein can be also used with any suitable computing device such as a laptop computer, a desktop computer, a set-top box, a game console, a digital media receiver, or any other suitable computing device.

Communications network 402 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 404, 406 and 412 can be any communications links suitable for communicating data among mobile devices 300, push notification servers 410, and application publisher servers 420, such as network links, dial-up links, wireless links, hardwired links, optical links, infrared links, any other suitable communications links, or any suitable combination of such links.

System 400 can include one or more push notification servers 410 that can identify a mobile device 300 on which a particular instance of an application that corresponds to a particular notification sent by application publisher server 420 is installed, can send push notifications for a particular instance of an application installed on a particular mobile device 300, can determine which notification to send from among multiple corresponding notifications for instances of different applications installed on a particular mobile device 300, can perform any other suitable functions, or perform any suitable combination of these functions.

System 400 can include one or more application publisher servers 420 that can send push notifications for a particular instance of an application. Application publisher server 420 can send these push notifications to push notification server 410 with information that identifies a particular instance or instances of the application to which the notification is directed. This identifying information can be based on information stored at application publisher server 410 or stored at push notification server 420. Application publisher server 420 can also perform any other suitable functions, such as formatting notifications, scheduling notifications, etc.

Figure 5:
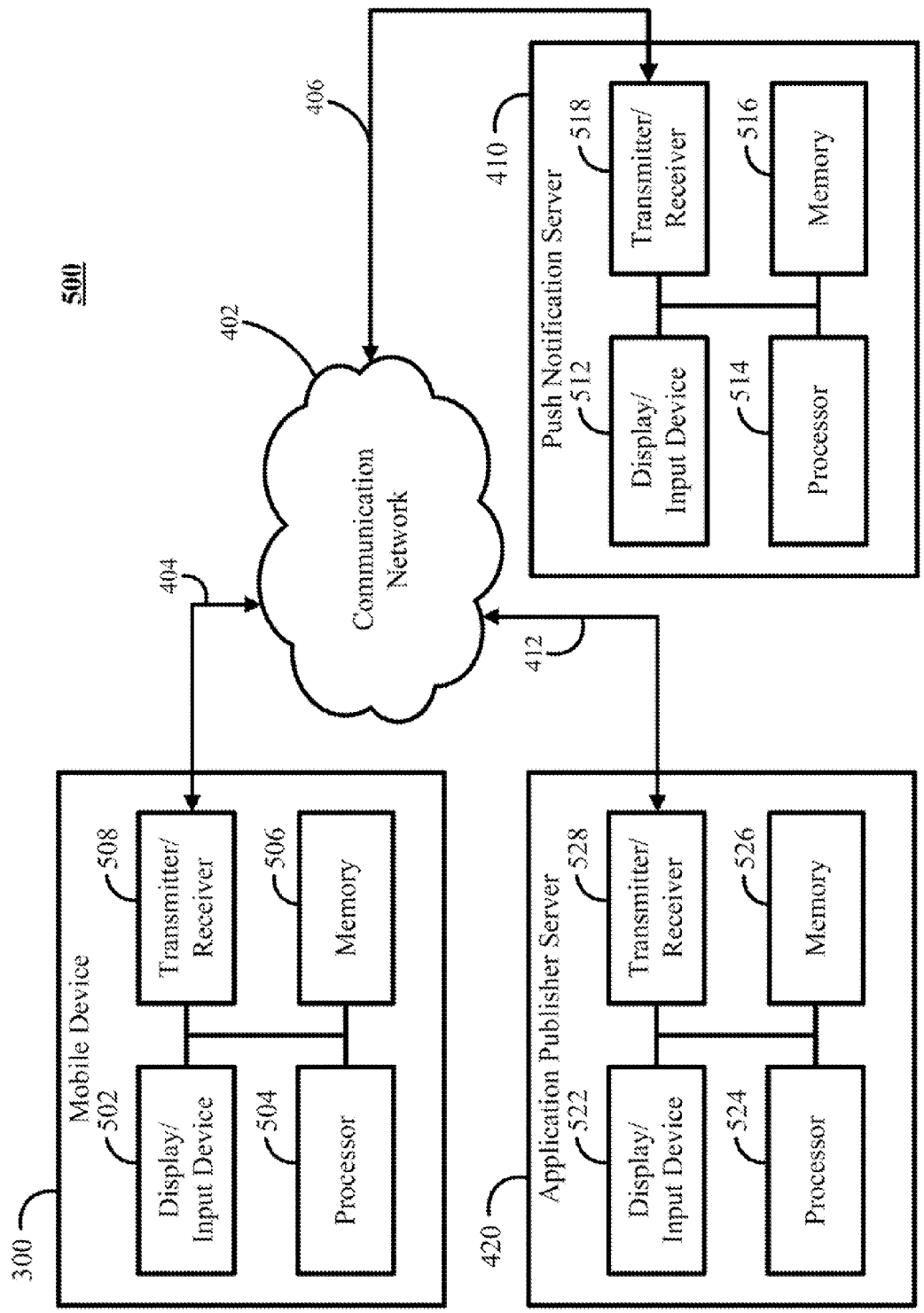
FIG. 5 shows a detailed example of a mobile device, a push notification server, and an application publisher server of FIG. 4 that can be used in accordance with some embodiments of the disclosed subject matter.

FIG. 5 illustrates an example 500 of hardware that can be used to implement one of mobile devices 300, push notification servers 410, and application publication servers 420 depicted in FIG. 4 in accordance with some embodiments of the disclosed subject matter. Referring to FIG. 5, mobile device 300 can include a display/input device 502, a hardware processor 504, memory 506, and a transmitter/receiver 508, which can be interconnected. In some embodiments, memory 506 can include a storage device (such as a non-transitory computer-readable medium) for storing a computer program for controlling hardware processor 502.

Hardware processor 504 can use the computer program to present on display/input device 502 a user interface for presenting various visual information to a user, such as notifications received from push notification server 410 and/or application publisher server 420, as well as any other suitable visual information such as a user interface for various applications installed on mobile device 300, a user interface of an operating system installed on mobile device 300. It should also be noted that data received through communications link 404 or any other communications links can be received from any suitable source. In some embodiments, hardware processor 404 can send and receive data through communications link 404 or any other communication links using, for example, a transmitter, receiver, transmitter/receiver, transceiver, or any other suitable communication device, such as transmitter/receiver 508. Display/input device 502 can include a touchscreen (e.g., touchscreen 302), a flat panel display, a projector, a cathode ray tube display, a video output port, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 508 can include any suitable transmitter and/or receiver for transmitting and/or receiving, among other things, push notifications sent from a push notification server 410 and/or application publication server 420.

Push notification server 410 can include a display/input device 512, a hardware processor 514, memory 516, and a transmitter/receiver 518, which can be interconnected. In some embodiments, memory 516 can include a storage device (such as a non-transitory computer-readable medium) for storing a server program for controlling hardware processor 514.

Hardware processor 514 can use the server program to communicate with mobile devices 300 to provide push notifications in accordance with the mechanisms described herein, to communicate with application publisher servers 420 to receive push notifications, as well as to perform any other suitable functions. It should also be noted that data received through communications link 406 or any other communications links can be received from any suitable source. In some embodiments, hardware processor 514 can send and receive data through communications link 406 or any other communication links using, for example, a transmitter, receiver, transmitter/receiver, transceiver, or any other suitable communication device, such as transmitter/receiver 518. Display/input device 512 can include a touchscreen, a flat panel display, a projector, a cathode ray tube display, a video output port, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 518 can include any suitable transmitter and/or receiver for transmitting and/or receiving, among other things, push notifications to mobile device 300, status information from mobile device 300, etc.

Application publisher server 420 can include a display/input device 522, a hardware processor 524, memory 526, and a transmitter/receiver 528, which can be interconnected. In some embodiments, memory 526 can include a storage device (such as a non-transitory computer-readable medium) for storing a server program for controlling hardware processor 524.

Hardware processor 524 can use the server program to communicate with push notification server 410 and/or mobile devices 300 to provide push notifications in accordance with the mechanisms described herein, to format and/or schedule push notifications to be sent to particular instances of an application associated with a particular application publisher server 420, to communicate with push notification server 410 and/or mobile devices 300 to establish an identity of a particular instance of an application and/or that the particular instance of the application is set to receive push notifications, as well as to perform any other suitable functions. It should also be noted that data received through communications link 412 or any other communications links can be received from any suitable source. In some embodiments, hardware processor 524 can send and receive data through communications link 412 or any other communication links using, for example, a transmitter, receiver, transmitter/receiver, transceiver, or any other suitable communication device, such as transmitter/receiver 528. Display/input device 522 can include a touchscreen, a flat panel display, a projector, a cathode ray tube display, a video output port, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 528 can include any suitable transmitter and/or receiver for transmitting and/or receiving, among other things, push notifications to push notification server 410 and/or mobile device 300, status information for mobile device 300 (e.g., based on the installation of the particular instance of the application), etc.

Figure 6:
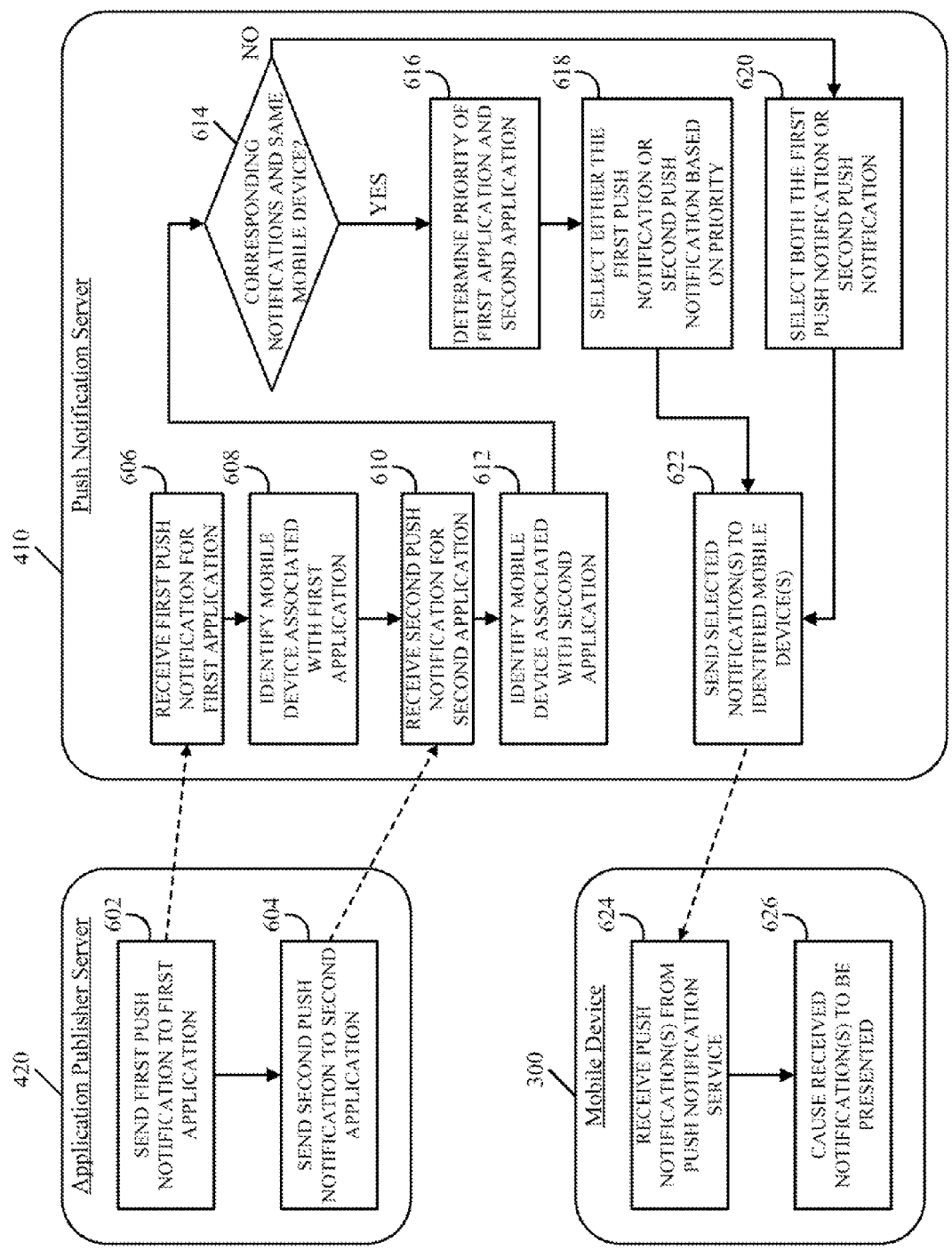
FIG. 6 shows an example of an illustrative flow for managing notifications directed to multiple applications installed on a user device in accordance with some embodiments of the disclosed subject matter.

Turning to FIG. 6, an example of an illustrative flow 600 between application publisher server 420, push notification server 410 and mobile device 300 is shown in accordance with some embodiments of the disclosed subject matter. At 602, application publisher server 420 can submit a request to send a first push notification that is directed to a particular instance or particular instances of a first application. This request can directed to push notification server 410, and can be sent using any suitable technique or techniques. In some embodiments, the request can be sent with identifying information that corresponds to a particular instance or particular instances of the first application to which the push notification is directed. Any suitable information can be used to identify the particular instance or particular instances of the first application, such as information described in connection with 106 of FIG. 1. The request sent at 602 can also include the content of the push notification to be sent to the particular instance or particular instances of the first application.

At 604, application publisher server 420 can submit a request to send a second push notification that is directed to a second application. As discussed above in connection with 602, the second request, like the first request, can be directed to a particular instance or particular instances of the second application. In some embodiments, the request submitted at 604 can be sent using similar techniques to the request submitted at 602, and can include similar types of information, such as information identifying a particular instance or particular instances of the second application. It should be noted that, although the second request is shown as originating from the same application publisher server 420 as the first request, this is merely for convenience and the first request and second request can originate from separate application publisher servers 420.

At 606, push notification server 410 can receive the request to send the first push notification from application publisher server 420. Any suitable technique or techniques can be used to receive the first request to send the first notification, such as techniques described above in connection with 106 of FIG. 1.

At 608, push notification server 410 can identify a mobile device or mobile devices associated with the particular instance or particular instances of the first application to which the first push notification is directed. Any suitable technique or techniques can be used to determine the identity of the mobile device to which the first push notification is directed, such as techniques described above in connection with 106 of FIG. 1.

At 610, push notification server 410 can receive the request to send the second push notification from application publisher server 420. As described above in connection with 606, any suitable technique or techniques can be used to receive the second request to send the first notification.

At 612, push notification server 410 can identify a mobile device or mobile devices associated with the particular instance of the second application to which the second push notification is directed. As described above in connection with 608, Any suitable technique or techniques can be used to determine the identity of the mobile device to which the second push notification is directed.

At 614, push notification server 410 can determine whether the mobile device identified at 608 is the same mobile device that was identified at 612, and can determine whether the first push notification corresponds to the second push notification (e.g., as described above in connection with 110 of FIG. 1). Push notification server 410 can determine whether the first notification and the second notification are corresponding notification using any suitable technique or techniques. For example, techniques described above in connection with 110 of FIG. 1 or any combination thereof can be used in determining whether the first notification and the second notification are corresponding notifications.

If the mobile devices identified at 608 and 612 are the same mobile device, and if the first push notification received at 606 and the second push notification received at 610 are corresponding notifications ("YES" at 614), push notification server 410 can proceed to 616.

At 616, push notification server 410 can determine whether the first application or the second application has priority for issuing the first notification or the second notification. Push notification server 410 can determine the priority of the first application and the second application using any suitable technique or techniques. For example, any of the techniques described above in connection with 112 of FIG. 1 or any combination thereof can be used in determining the priority of the first application and the second application.

At 618, push notification server 410 can select either the first push notification or the second push notification to be sent to the mobile device identified at 608 and 612 based on the priority determined at 616. Note that selection of which push notification to send can be made as a default choice, and may not be a positive selection of a particular push notification. More particularly, push notification server 410 can send all received notifications unless a process, such as process 100, results in the inhibition of a particular push notification being sent.

Returning to 614, if the mobile devices identified at 608 and 612 are not the same, or if the first push notification received at 606 and the second push notification received at 610 are not corresponding notifications ("NO" at 614), push notification server 410 can proceed to 620.

At 620, push notification server 410 can select both the first push notification and the second push notification to be sent to the mobile device or mobile devices identified at 608 and 612.

At 622, push notification server 410 can cause the push notification or push notifications selected at either 618 or 620 to be sent to the mobile device or mobile devices identified at 608 and 612. Any suitable technique or techniques can be used to send the push notification or the push notifications at 622, such as techniques described in connection with 114 of FIG. 1.

At 624, mobile device 300 can receive one or more push notifications from push notification server 410. The one or more push notifications received can be the push notification or push notifications sent at 622. It is noted that, although a single mobile device 300 is shown, as described above in connection with 614 and 620, the first push notification and the second push notification may not be directed at the same mobile device 300. In this case, the push notifications can be sent to different mobile devices 300.

At 626, mobile device 300 can cause the push notification or push notifications received at 624 to be presented (e.g., using a display of mobile device 300). As described above in connection with 216 of FIG. 2 and in connection with FIG. 3, presentation of the notification or notifications can be based on settings of the particular mobile device 300 that is presenting the notification.

Figure 7:
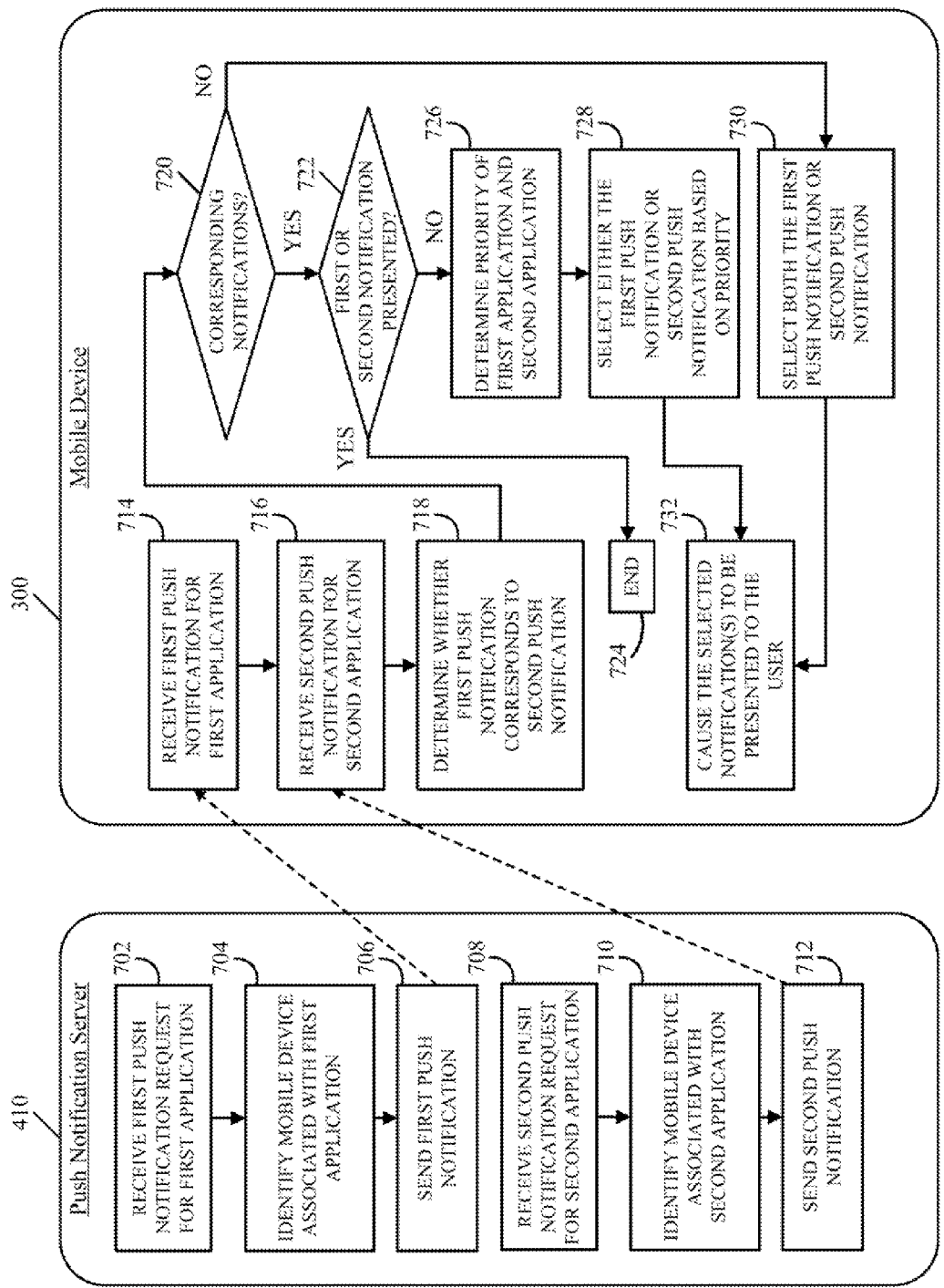
FIG. 7 shows an example of an illustrative flow for managing notifications received for multiple applications installed on a user device in accordance with some embodiments of the disclosed subject matter.

FIG. 7 shows an example of an illustrative flow 700 between push notification server 410 and mobile device 300 in accordance with some embodiments of the disclosed subject matter. At 702, push notification server 410 can receive a first request to send a push notification to a particular instance of a first application. As described above, the first request received at 702 can be received from an application publisher server 420 that requests that the first push notification be sent to a mobile device 300 or mobile devices 300 that have installed a particular instance or particular instances of the first application. As also described above, any suitable technique or techniques can be used to receive the first push notification, such as techniques described above in connection with 106 of FIG. 1.

At 704, push notification server 410 can identify a mobile device 300 or mobile devices 300 associated with the particular instance or particular instances of the first application. Any suitable technique or techniques can be used to identify mobile device 300 associated with the particular instance of the first application, such as techniques described above in connection with 106 of FIG. 1.

At 706, push notification server 410 can send the first push notification to the mobile device identified at 704. As described above in connection with, for example, 114 of FIG. 1, any suitable technique or techniques can be used to send the first push notification to the mobile device identified at 704.

At 708, push notification server 410 can receive a second request to send a push notification to a particular instance or particular instances of a second application. As described above, the second request received at 708 can be received from an application publisher server 420 the requests that the second push notification be sent to a mobile device 300 or mobile devices 300 that have installed a particular instance or particular instances of the second application. As also described above in connection with 106 of FIG. 1, any suitable technique or techniques can be used to receive the second push notification.

At 710, push notification server 410 can identify a mobile device or mobile devices associated with the particular instance or particular instances of the second application. As described above in connection with, for example, 706 and 106 of FIG. 1, any suitable technique or techniques can be used in identifying a mobile device 300 associated with the particular instance of the second application.

At 712, push notification server 410 can send the second push notification to the mobile device identified at 710. As described above in connection with, for example, 114 of FIG. 1, any suitable technique or techniques can be used to send the second push notification to the mobile device identified at 710.

At 714, mobile device 300 can receive the first push notification from the push notification server. As described above in connection with, for example, 202 of FIG. 2, any suitable technique or techniques can be used to receive the first push notification.

At 716, mobile device 300 can receive the second push notification from the push notification server. As described above in connection with, for example, 202 of FIG. 2, any suitable technique or techniques can be used to receive the second push notification.

At 718, mobile device 300 can determine whether the first push notification received at 714 corresponds to the second push notification received at 716. Any suitable technique or techniques can be used in determining whether the first push notification and the second push notification are corresponding notifications, such as techniques described above in connection with, for example, 110 of FIGS. 1 and 204 of FIG. 2.

If the first push notification is determined to correspond to the second push notification at 718 ("YES" at 720), mobile device 300 can proceed to 722.

At 722, mobile device 300 can determine whether the first push notification or the second push notification has already been presented by mobile device 300 (e.g., by being presented to the user). If the first push notification or the second push notification has already been presented to the user ("YES" at 722), mobile device 300 can proceed to 724 and end flow 700. Otherwise, if neither the first push notification nor the second push notification has been presented by mobile device 300 ("NO" at 722), mobile device 300 can proceed to 726.

At 726, mobile device 300 can determine a priority between the first application and the second application to determine whether the first push notification or the second push notification should be presented to the user. Any suitable technique or techniques can be used to determine the priority, such as techniques described in connection with, for example, 112 of FIG. 1.

At 728, mobile device 300 can select either the first push notification or the second push notification to present to the user based on the priority of the first push notification and the second push notification.

Returning to 720, if the first push notification and the second push notification are not corresponding notifications ("NO" at 720), mobile device 300 can proceed to 730. At 730, mobile device 300 can select both the first push notification and the second push notification for presentation to the user. Additionally or alternatively, after determining that a notification does not correspond to another notification, mobile device 300 can cause the notification to be presented. Note that selection of which push notification to issue can be made as a default choice, and may not be a positive selection of a particular push notification. More particularly, a user device, such as mobile device 300 can present all received notifications unless a process, such as process 200, results in the inhibition of a particular push notification being presented.

At 732, mobile device 300 can cause the push notification or push notifications selected at 728 or 730 to be presented to a user of mobile device 300. As described above in connection with 216 of FIG. 2 and in connection with FIG. 3, any suitable technique or techniques can be used to present the push notification to the user. Note that presenting the push notification does not require knowledge about whether the user actually viewed the presented notification.

In some embodiments, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. For instance, these mechanisms can encompass a computer program written in a programming language recognizable by mobile device 300, push notification server 410 and/or application publisher server 420 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about user actions stored on a user device such as mobile device 300, information about user actions stored on a remote device such as push notification server 410, application publisher server 420, etc.), or to control whether and/or how push notifications. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 1, 2, 6 and 7 can be executed or performed in any order or sequence not limited to the order and sequence shown and described in the figures. Also, some of the above steps of the processes of FIGS. 1, 2, 6 and 7 can be executed or performed substantially simultaneously where appropriate or in parallel to reduce latency and processing times. Furthermore, it should be noted that FIGS. 1, 2, 6 and 7 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for managing notifications directed to multiple applications installed on a user device are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for managing notifications, the method comprising:
receiving, over the Internet using a hardware processor of a push notification server, a first push notification directed to an instance of a first application;
determining that the instance of the first application is installed on a first user device;
receiving, over the Internet at the push notification server, a second push notification directed to an instance of a second application;
determining that the instance of the second application is installed on the first user device;
in response to determining that both the instance of the first application and the instance of the second application are installed on the first user device, and prior to the first push notification and the second push notification being sent, determining that the first push notification and the second push notification are corresponding notifications;
determining, based on a comparison of information about the first push notification and information about the second push notification, that the first push notification has priority over the second push notification;
sending, by the push notification server, the first push notification to the first user device upon determining that the first push notification has priority over the second push notification; and
inhibiting the second push notification from being sent to the first user device by the push notification server.

2. The method of claim 1, further comprising:
receiving an application identifier that uniquely identifies the instance of the first application; and
determining a device identifier of the first user device based on a device associated with the application identifier.

3. The method of claim 2, further comprising determining that the same device identifier is associated with both the instance of the first application and the instance of the second application.

4. The method of claim 1, wherein determining that the first notification and the second notification are corresponding notifications comprises:
determining a distance metric between content of the first push notification and content of the second push notification; and
determining that the content of the first push notification is the same as the content of the second push notification based on the determined distance metric being below a threshold.

5. The method of claim 1, wherein determining that the first notification and the second notification are corresponding notifications comprises:
determining a first notification identifier associated with the first push notification;
determining a second notification identifier associated with the second push notification; and
determining that the first notification and the second notification are corresponding notifications based on correspondence between the first notification identifier and the second notification identifier.

6. The method of claim 1, wherein determining that the first push notification has priority over the second notification comprises determining that the first push notification and the second push notification are both directed at content that is available by using the first application but not by using the second application.

7. The method of claim 1, wherein determining that the first push notification has priority over the second push notification comprises determining that the first application is explicitly designated by both the first push notification and the second push notification as having priority over the second application.

8. The method of claim 1, wherein determining that the first push notification has priority over the second push notification comprises determining that the first application and the second application are from the same application publisher and that the first application facilitates access to a particular subset of the content that is accessible using the second application.

9. A system for managing notifications, the system comprising:
a push notification server comprising a hardware processor that is configured to:
receive, over the Internet, a first push notification directed to an instance of a first application;
determine that the instance of the first application is installed on a first user device;
receive, over the Internet, a second push notification directed to an instance of a second application;
determine that the instance of the second application is installed on the first user device;
in response to determining that both the instance of the first application and the instance of the second application are installed on the first user device, and prior to the first push notification and the second push notification being sent, determine that the first push notification and the second push notification are corresponding notifications;
determine, based on a comparison of information about the first push notification and information about the second push notification, that the first push notification has priority over the second push notification;
send the first push notification to the first user device upon determining that the first push notification has priority over the second push notification; and
inhibit the second push notification from being sent to the first user device.

10. The system of claim 9, wherein the hardware processor is further configured to:
receive an application identifier that uniquely identifies the instance of the first application; and
determine a device identifier of the first user device based on a device associated with the application identifier.

11. The system of claim 10, wherein the hardware processor is further configured to determine that the same device identifier is associated with both the instance of the first application and the instance of the second application.

12. The system of claim 9, wherein the hardware processor is further configured to:
determine a distance metric between content of the first push notification and content of the second push notification; and
determine that the content of the first push notification is the same as the content of the second push notification based on the determined distance metric being below a threshold.

13. The system of claim 9, wherein the hardware processor is further configured to:
- determine a first notification identifier associated with the first push notification;
- determine a second notification identifier associated with the second push notification; and
- determine that the first push notification and the second push notification are corresponding notifications based on correspondence between the first notification identifier and the second notification identifier.

14. The system of claim 9, wherein the hardware processor is further configured to determine that the first push notification and the second push notification are both directed at content that is available by using the first application but not by using the second application.

15. The system of claim 9, wherein the hardware processor is further configured to determine that the first application is explicitly designated by both the first push notification and the second push notification as having priority over the second application.

16. The system of claim 9, wherein the hardware processor is further configured to determine that the first application and the second application are from the same application publisher and that the first application facilitates access to a particular subset of the content that is accessible using the second application.

17. A non-transitory computer-readable medium containing computer executable instructions that, when executed by a processor, cause the processor to perform a method for managing notifications, the method comprising:
- receiving, over the Internet at a push notification server, a first push notification directed to an instance of a first application;
- determining that the instance of the first application is installed on a first user device;
- receiving, over the Internet at the push notification server, a second push notification directed to an instance of a second application;
- determining that the instance of the second application is installed on the first user device;
- in response to determining that both the instance of the first application and the instance of the second application are installed on the first user device, and prior to the first push notification and the second push notification being sent, determining that the first push notification and the second push notification are corresponding notifications;
- determining, based on a comparison of information about the first push notification and information about the second push notification, that the first push notification has priority over the second push notification;
- sending, by the push notification server, the first push notification to the first user device upon determining that the first push notification has priority over the second push notification; and
- inhibiting the second push notification from being sent to the first user device by the push notification server.

18. The non-transitory computer-readable medium of claim 17, wherein the method further comprises:
- receiving an application identifier that uniquely identifies the instance of the first application; and
- determining a device identifier of the first user device based on a device associated with the application identifier.

19. The non-transitory computer-readable medium of claim 18, wherein the method further comprises determining that the same device identifier is associated with both the instance of the first application and the instance of the second application.

20. The non-transitory computer-readable medium of claim 17, wherein determining that the first notification and the second notification are corresponding notifications comprises:
- determining a distance metric between content of the first push notification and content of the second push notification; and
- determining that the content of the first push notification is the same as the content of the second push notification based on the determined distance metric being below a threshold.

21. The non-transitory computer-readable medium of claim 17, wherein determining that the first notification and the second notification are corresponding notifications comprises:
- determining a first notification identifier associated with the first push notification;
- determining a second notification identifier associated with the second push notification; and
- determining that the first notification and the second notification are corresponding notifications based on correspondence between the first notification identifier and the second notification identifier.

22. The non-transitory computer-readable medium of claim 17, wherein determining that the first push notification has priority over the second push notification comprises determining that the first push notification and the second push notification are both directed at content that is available by using the first application but not by using the second application.

23. The non-transitory computer-readable medium of claim 17, wherein determining that the first push notification has priority over the second push notification comprises determining that the first application is explicitly designated by both the first push notification and the second push notification as having priority over the second application.

24. The non-transitory computer-readable medium of claim 17, wherein determining that the first push notification has priority over the second push notification comprises determining that the first application and the second application are from the same application publisher and that the first application facilitates access to a particular subset of the content that is accessible using the second application the second application.

* * * * *